United States Patent

[11] 3,596,201

[72] Inventor Arthur N. Chester
 Murray Hill, N.J.
[21] Appl. No. 48,817
[22] Filed June 8, 1970
[45] Patented July 27, 1971
[73] Assignee Hughes Aircraft Company
 Culver City, Calif.

[54] FREQUENCY STABILIZED LASER
 3 Claims, 3 Drawing Figs.
[52] U.S. Cl. .................................................. 331/94.5
[51] Int. Cl. .................................................. H01s 3/00
[50] Field of Search ....................................... 331/94.5

[56] References Cited
UNITED STATES PATENTS
3,227,396 10/1966 Statz et al. .................. 243/16
3,361,990 1/1968 Gordon et al. ............... 331/94.5
3,453,557 7/1969 Polanyi et al. ............... 331/94.5

OTHER REFERENCES
Kannelaud, J. et al. " Frequency Stabilization of the Zeeman Laser." Applied Physics Letters Vol. 10, No. 3, Feb. 1, 1967. pp. 94— 96.

White, A. D. et al " Frequency Stabilization of Single Mode Gas Lasers." APPLIED PHYSICS LETTERS. Vol. 5, No. 5, Sept. 1, 1964. pp. 97— 98.

Primary Examiner—Ronald L. Wibert
Assistant Examiner—T. Major
Attorneys—James K. Haskell and John Holtrichter, Jr.

ABSTRACT: A frequency stabilized laser is disclosed in which active laser material exhibiting Zeeman effects is disposed in a resonant laser cavity to which an axial magnetic field is applied for producing Zeeman-splitting, and in which a feedback error signal is applied to adjust the frequency of laser oscillation. Optical means, including quarter-wave plates, are disposed in the laser cavity for insuring that the laser energy propagating in the laser material in a first axial direction is polarized in a first circular polarization sense only, as measured with respect to the direction of the applied magnetic field, and for insuring that the laser energy propagating in the laser material in the opposite axial direction is polarized in the opposite circular polarization sense only, as measured with respect to the direction of the magnetic field.

PATENTED JUL 27 1971 3,596,201
Fig. 1.
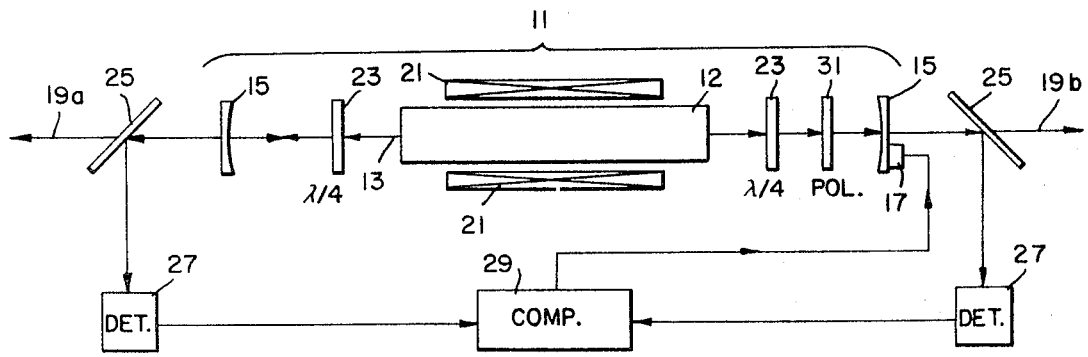
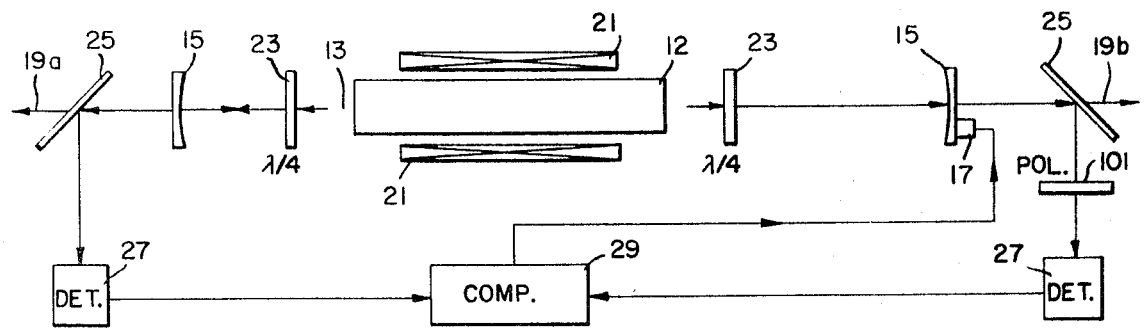
Fig. 3.
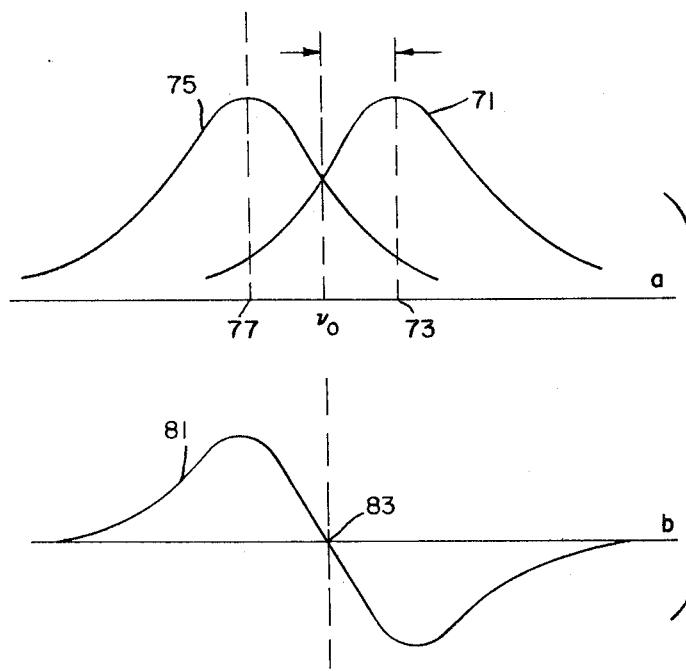
Fig. 2.
Arthur N. Chester,
INVENTOR.
BY.
John Holtrichter Jr.
ATTORNEY.

FREQUENCY STABILIZED LASER

This is a continuation of Ser. No. 678,292 filed Oct. 24, 1967, now abandoned.

The need for and advantages of a stabilized source of oscillation is well known in the radio frequency (RF) electromagnetic energy art. The need for and advantages of such a source of oscillation also applies to the much higher, near optical frequency range generators such as lasers, for example, but is much more difficult to attain. A stabilized laser oscillator is extremely useful in a linear measurement system, for example, and also has many advantageous metrological applications. Furthermore, it can be used as a source to make accurate gain-linewidth measurements and investigations of single atom coherence effects in lasers.

Ordinary electronic RF oscillators are usually stabilized by referencing to some stable controlling element such as a piezoelectric crystal. The crystal oscillator is intrinsically orders of magnitude more stable than the frequency determining elements in the oscillator such as LC circuit parameters. The problem with optical oscillators is that there are no known frequency determining elements related to lasers as crystals are related to LC oscillators. One drawback of most laser oscillators to date is that the actual oscillation frequency is determined to the first order by the cavity spacing. This means that such a laser oscillator capable of extremely high purity frequency output over a long time period is limited by the mechanical stability of the cavity. The two principle causes of mechanical instability are microphonics, including acoustic effects, and thermodrift. A third possible source of drift is atmospheric pressure changes which can be neglected here since it can easily be eliminated by conventional means.

The usual way to stabilize a laser oscillator has been to isolate it from thermal and mechanical shock. Usually this involves immersing the laser cavity in as nearly a constant temperature bath as possible, such as a controlled temperature and humidity room and mounting the laser cavity on a vibration-free and isolated platform, sometimes located underground. The cavity mirrors have also been mounted internally with respect to the laser in order to remove fluctuations due to perturbations in the cavity, such as scattering from dust particles, etc., that afflict Brewster angle lasers with externally mounted mirrors, for example. Generally, isolation methods have proved to be impractical for most applications.

Feedback systems have also been used in an effort to obtain satisfactory stabilization. In an early attempt to gain the desired goal, a servosystem was devised to keep the total output intensity at a maximum. However, this technique proved to be too insensitive to stabilize the oscillator to within better than some tens of megacycles. Later, experiments were conducted where an error signal was produced by oscillating one of the reflectors comprising the resonant cavity of the laser at an audio rate and directing a portion of the laser output at a photodetector, the output of which was phase detected to provide a DC voltage proportional to the derivative of the curve of output power plotted against frequency. The laser output was then locked to one of three zero slope points resulting from a center tuning dip by properly applying this feedback energy to the oscillating reflector. The drawback here was that the laser beam was frequency modulated.

Subsequently, a much improved scheme was devised that derived the error signal from the laser transition's absorption- or gain-frequency profile. The error signal was formed by having the output beam of a laser explore the absorption-frequency profile. Here, the absorption-line profile is either split or shifted symmetrically about the transition's center frequency. This method uses a switch in the optical path, such as a switched KDP polarizer or a switch absorption cell, to sample the two halves of the error signal or discriminant alternately. The switching requirement imposes an objectionable upper limit on the frequency of the jitter in the optical output that can be stabilized by this method. Later, the need for a switching element was eliminated by a device that provides two optical paths that continuously measure the two halves of the frequency discriminant. This was accomplished by coupling a sample of the output optical frequency energy of the laser to be stabilized into opposite ends of a line shifting cell wherein the energy is propagated in opposite directions and thereafter separately detected and then continuously compared. Wherever there was a difference in amplitude detected between the oppositely propagating optical frequency energy, an error signal was provided which, in turn, was amplified and then coupled to the controlled frequency laser in order to change the frequency output energy in a direction to cancel the error signal.

In contrast to the prior laser stabilization art as above described, the invention has the advantage of eliminating the need for a switching element or the need for a line shifting absorption cell. It has the further advantage that it can be tuned over a frequency range of about the Doppler linewidth without varying any magnetic field and, furthermore, requires no accurate moving mirror device.

It is therefore an object of the present invention to provide an improved stabilized laser oscillator.

It is another object of the invention to provide a stabilized laser oscillator that does not incorporate a switching element in the optical path.

It is still another object of the present invention to provide a stabilized laser oscillator that does not incorporate an absorption cell.

It is yet another object of the present invention to provide a simpler, cheaper and easier to implement stabilized laser oscillator.

It is a further object of the invention to provide a stabilized laser oscillator that may be tuned over a frequency range of about the Doppler linewidth without varying a magnetic field.

These and other objects of the invention are obtained, according to one embodiment of the invention, in a frequency stabilized laser wherein an active laser material is disposed in a resonant cavity having a longitudinal axis and two at least partially reflective mirrors disposed at each end thereof on the axis. The resonant cavity is provided with a means for adjusting its resonant frequency and with a means for exciting the laser material to produce a beam of laser energy along the axis. The stabilized laser is also provided with a solenoid for producing a magnetic field of constant magnitude passing essentially parallel to the axis of the cavity through the laser material. Optical elements are disposed in the laser cavity for circularly polarizing, with respect to the axis, oppositely propagating laser energy in opposite directions. Finally, a pair of detectors and a comparator circuit are coupled to the laser energy at the end of the resonant cavity in order to compare the intensities of oppositely propagating laser energy and to provide an error signal to the frequency adjusting portion of the resonant cavity so as to change the frequency of the laser oscillation in a direction to minimize the error signal and thus stabilize its frequency.

The invention and specific embodiments thereof will be described hereinafter by way of example and with reference to the accompanying drawing wherein like reference numerals refer to like elements or parts and in which:

FIG. 1 is a schematic diagram of a preferred embodiment of the invention;

FIG. 2 illustrates graphically the intersection of the gain-versus-frequency curves for the two Zeeman lines produced by the magnetic field passing through the active laser material of the laser; and FIG. 3 illustrates another embodiment of the invention.

With reference now to the drawing and more particularly to FIG. 1, there is shown an adjustable frequency resonant laser cavity 11 having a longitudinal axis 13 and including active laser material 12 and two similar at least partially reflective mirrors 15 disposed one at each end of the cavity 11 on the axis 13. The laser material may be a ruby rod, neodymium glass, a laseable gas or semiconductor, for example. An electromechanical transducer 17 of lead zirconium titanate, or other material having similar properties, is attached to one of the reflectors 15 so that the frequency of oscillation of the laser 11 is changed in accordance with an error signal applied to the transducer 17.

In order to produce a beam of laser energy as indicated by arrows 19, the active laser material 12 is pumped to an excited state by a conventional source of pumping energy not shown. Also included in the invention is a magnetic field source such as a solenoid 21 disposed about the laser material 12 and connected to a connected to a current source not shown so as to provide a magnetic field of constant magnitude passing essentially parallel to the axis 13 through the laser material 12.

Optical elements such as quarter-wave plates 23 are introduced in the laser beam within the resonant cavity 11 and adjacent to opposite ends of the laser material 12 so that the laser beam inside the resonant cavity 11 has the opposite circular polarization with respect to the longitudinal magnetic field on each pass through the tube. Since the polarization opposes the field in one direction of propagation and is parallel to it when the light returns after being reflected by one of the reflectors 15, the gain in passing through the tube is different and, hence, the light output from either end is different in intensity, unless the frequency lies on the intersection ($\nu_0$) of the gain-versus-frequency curves for the two Zeeman lines (see FIG. 2). These intensities are null-detected for comparison by the use of partially reflecting mirrors or glass plates 25 disposed in the laser beam path outside of the laser cavity 11 in order to reflect toward conventional photodetectors 27 a small portion of the laser energy travelling in opposite directions (19a and 19b). Each of the photodetectors is coupled to a comparator 29 of conventional design which in effect subtracts the signals from the photodetectors 27 and provides a difference or error signal that is coupled to the PZT element 17 on one of the reflectors 15. The error signal is of a magnitude and sense that will adjust the frequency of the laser oscillation to minimize the error signal.

An optical element such as a plane polarizer 31 or a Brewster-angle window may also be inserted in the laser cavity 11 between one quarter-wave plate and its nearby reflector to select only one of the two possible circularly polarized laser modes so that there will be no mode jumping or confusion in the signals.

The operation of the invention with respect to the production of the error signal may best be explained by making reference to FIG. 2a which shows the Zeeman-split components as viewed simultaneously at the output terminals of both detectors 27. The curve 71, having a center frequency represented by dashed line 73, represents the gain as a function of frequency experienced by light travelling in the direction of arrow 19a and the curve 75, having a center frequency at dashed line 77, represents the gain as a function of frequency experienced by light travelling in the direction of arrow 19b. It should be noted that the center line frequency of each component of the gain as a function of frequency is shifted from its original center frequency $\nu_0$ by the same amount but in different directions.

When the photodetector output signals are simultaneously presented to the comparator 29, an algebraic subtraction takes place and an error signal is produced by the comparator. This is not to infer that the function of the detector-comparator system is necessarily to make the intensity of the laser output from either end equal but only to make it have a fixed ratio of intensities, as will be discussed later.

The error signal as produced by the comparator has a characteristic discriminator S configuration as a function of frequency and is shown in FIG. 2b. Thus, in operation when the frequency of the laser oscillator to be controlled deviates in either direction from its original line center frequency, an error signal will be produced having a magnitude dependent upon the amount of deviation and a polarity dependent upon the direction of deviation. Although not shown in the drawings, the error signal may first be amplified and then coupled to the electromechanical transducer 17 or may be coupled directly to it. Of course, an integration amplifier may also be incorporated in this feedback loop in order to provide a more precise null-seeking arrangement.

In the embodiment of FIG. 1, the reflectors 15 may have the same reflectivity and transmissivity to produce beams of equal intensity in the directions 19a and 19b helpful in obtaining very accurate stabilization, for example, or one reflector may be made strongly reflecting so that only a small amount of power comes out of that end of the laser. The other reflector can then be chosen for maximum output power. The stronger beam coming from this end may now be sampled by one of the partially reflecting mirrors 25, leaving most of the beam in this direction undisturbed for the laser output. By choosing the amount of light sampled from this strong beam (by adjusting the angle of the glass plate, for example), the amount sampled can be chosen so that the comparator will attempt to make the power of the sample equal to the power coming from the other end of the laser and it will lock on to the center frequency of the undisturbed gain line. Of course, by choosing a different amount of sampled power, the laser will be locked to some other frequency.

The operation of the Zeeman-splitting function and the quarter-wave plate combination within the laser resonator 11 may be best understood by choosing coordinate axes so that $x$, $y$ are perpendicular to the length of the laser resonator 11 and by having the $z$ axis lying along the axis 13. The optical axes of the quarter-wave plates 23 are along the $x$ and $y$ axes. The plane polarizer 31 in the resonant cavity 11 introduces loss in a plane polarized component at 45° to the $x$ and $y$ axes. The magnetic field is in the $z$ direction along the axis 13. This may be represented by the equation $$\underset{\sim}{E} = Re\ \underset{\sim}{\hat{E}}\ \exp\ (-iwt + ikz).$$

Now consider a right-hand circularly polarized light wave travelling through the resonant cavity 11 in the direction of arrow 19b. Its electric field phasor may be represented by $$E_0(\hat{i} + i\hat{j}).$$

After passing through the quarter-wave plate 23, its electric field phasor is $$E_0(\hat{i} + \hat{j}), \text{i.e., plane polarized.}$$

After it reflects and passes through the quarter-wave plate 23, its field becomes $$\underset{\sim}{E_0}(\hat{i} - i\hat{j}),$$

but since its direction has changed, this is left-hand circularly polarized with respect to the magnetic field (right-hand circularly polarized with respect to the direction of propagation of the beam). A similar operation happens at the other end of the resonant cavity 11. Thus, the laser beam sees different Zeeman-split components of the line when going through the resonant cavity in opposite directions and the relative gains give a measure of how far off the mean frequency (which is equalled to the unshifted line frequency for a symmetric Doppler-broadened line) the laser energy is.

With respect to FIG. 3, there is shown another embodiment of the invention wherein a rotatable plane polarizer 101 is introduced in front of either of the two detectors 27, outside the resonant cavity 11. This is to reduce the size of the power seen by its adjacent detector for the same purpose as the adjusting of the angle of the glass plate described earlier. Thus, the comparator 29 will, if desired, give a null-signal at any predetermined desired frequency (dependent upon the characteristic of a particular polarizer used) as long as that frequency is not too far from the unshifter line.

Where extremely accurate frequency stabilization is desired, it may be desirable to make all of the optical elements, mirrors, reflectors and quarter-wave plates identical. The comparing and seeking a null will then lock the laser very close to line center. Of course, account should be taken of line asymmetry due to pressure broadening, etc. Because line shape is not generally strongly dependent upon current, fluctuations in the pump power (discharge current for a gas laser) will not affect the frequency locked on to. This latter point is more of the case in the equal-beam embodiment then in the higher power single output beam case having one highly reflecting and one very transmissive reflectors because of asymmetrical gain-saturation effects changing with fluctuations in pump power.

From the foregoing, it should be seen that the invention provides an improved stabilized laser oscillator whose output frequency may be very accurately maintained on some predetermined frequency and which is tunable over the Doppler linewidth.

In practicing the invention, any laser oscillator configuration may be substituted for the laser oscillator resonant cavity 11 described herein whether a solid, gas or solid-state device is used. It should also be understood that any element which exhibits the same characteristics as described for the various elements utilized and shown in the drawing may be substituted therefor.

It is intended that the foregoing disclosure and drawing shall be considered only as illustrations of the principle of this invention and are not to be construed in a limiting sense.

What I claim is:

1. A frequency stabilized laser, comprising:
   a resonant laser cavity having a longitudinal axis and including two at least partially reflective mirrors disposed one at each end thereof on said axis,
   adjustable frequency means coupled to said resonant cavity for adjusting the resonant frequency thereof,
   active laser material exhibiting Zeeman effects disposed in said laser cavity on said axis,
   pump means coupled to said laser material for exciting said material to produce a beam of laser energy along said axis,
   Zeeman-splitting means disposed adjacent said resonant cavity for producing a magnetic field of constant magnitude passing essentially parallel to said axis through said laser material,
   optical means disposed in said laser cavity for insuring that the laser energy propagating in said laser material in a first axial direction is polarized in a first circular polarization sense only as measured with respect to the direction of said magnetic field and for insuring that the laser energy propagating in said laser material in a second axial direction opposite to said first axial direction is polarized in a second circular polarization sense only, said second circular polarization sense being opposite to said first circular polarization sense as measured with respect to the direction of said magnetic field, and
   comparison means coupled to said beam of laser energy and to said adjustable frequency means for comparing the respective intensities of the laser energy propagating in said first and second axial directions and to provide an error signal of a magnitude and sense that will adjust the frequency of the laser oscillation to minimize said error signal.

2. A frequency stabilized laser comprising:
   a laser medium capable of exhibiting Zeeman effects;
   pump means coupled to said laser medium for exciting said medium so that it produces and emits from opposite ends thereof respective first and second beams of laser energy propagating in opposite longitudinal directions;
   first and second reflectors spaced from the respective ends of said laser medium and disposed in the respective paths of said first and second laser beams for reflecting most of the laser energy in said beams back into said medium;
   transducer means coupled to one of said reflectors for adjusting the frequency of laser oscillation;
   Zeeman-splitting means disposed adjacent said laser medium for producing a longitudinal magnetic field of an essentially constant magnitude;
   a first quarter-wave plate disposed in the path of said first laser beam between said laser medium and said first reflector;
   a plane polarizer element disposed in the path of said first laser beam between said first quarter-wave plate and said first reflector;
   a second quarter-wave plate disposed in the path of said second laser beam between said laser medium and said second reflector; and
   comparison means including a first photodetector coupled to said first laser beam, a second photodetector coupled to said photodetectors and to said transducer means for comparing the intensity of said first and second laser beams and for providing an error signal of a magnitude and sense to adjust the frequency of laser oscillation to minimize said error signal.

3. A frequency stabilized laser comprising:
   a laser medium capable of exhibiting Zeeman effects;
   pump means coupled to said laser medium for exciting said medium so that it produces and emits from opposite ends thereof respective first and second beams of laser energy propagating in opposite longitudinal directions;
   first and second reflectors spaced from the respective ends of said laser medium and disposed in the respective paths of said first and second laser beams for reflecting most of the laser energy in said beams back into said medium;
   transducer means coupled to one of said reflectors for adjusting the frequency of laser oscillation;
   Zeeman-splitting means disposed adjacent said laser medium for producing a longitudinal magnetic field of an essentially constant magnitude;
   a first quarter-wave plate disposed in the path of said first laser beam between said laser medium and said first reflector;
   a Brewster angle window disposed in the path of said first laser beam between said first quarter-wave plate and said first reflector;
   a second quarter-wave plate disposed in the path of said second laser beam between said laser medium and said second reflector; and
   comparison means including a first photodetector coupled to said first laser beam, a second photodetector coupled to said second laser beam, and a comparator circuit coupled to said photodetectors and to said transducer means for comparing the intensity of said first and second laser beams and for providing an error signal of a magnitude and sense to adjust the frequency of laser oscillation to minimize said error signal.

PO-1050
(5/69)

UNITED STATES PATENT OFFICE
CERTIFICATE OF CORRECTION

Patent No. 3,596,201     Dated July 27, 1971

Inventor(s) Arthur N. Chester

It is certified that error appears in the above-identified patent and that said Letters Patent are hereby corrected as shown below:

Column 1, line 10, after "optical" insert --and optical--.
Column 3, line 11, after "a" delete "connected to a".
Column 4, line 67, "unshifter" should be --unshifted--.
Column 6, line 23, after "said" (first occurrence), insert --second laser beam, and a comparator circuit coupled to said--.

Signed and sealed this 15th day of February 1972.

(SEAL)
Attest:

EDWARD M. FLETCHER, JR.
Attesting Officer

ROBERT GOTTSCHALK
Commissioner of Patents